(12) United States Patent
Cheng et al.

(10) Patent No.: US 11,064,016 B2
(45) Date of Patent: *Jul. 13, 2021

(54) UNIVERSAL CONNECTORS FOR CLOUD DATA LOSS PREVENTION (DLP)

(71) Applicant: Netskope, Inc., Santa Clara, CA (US)

(72) Inventors: Lebin Cheng, Saratoga, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,374

(22) Filed: Jun. 11, 2019

(65) Prior Publication Data

US 2019/0364097 A1 Nov. 28, 2019

Related U.S. Application Data

(63) Continuation of application No. 15/986,732, filed on May 22, 2018.

(51) Int. Cl.
*H04L 29/08* (2006.01)
*G06F 16/955* (2019.01)
(Continued)

(52) U.S. Cl.
CPC .............. *H04L 67/10* (2013.01); *G06F 9/547* (2013.01); *G06F 16/9566* (2019.01); *H04L 67/42* (2013.01)

(58) Field of Classification Search
CPC .................. H04L 41/5025; H04L 41/0813
(Continued)

(56) References Cited

U.S. PATENT DOCUMENTS 6,959,326 B1 * 10/2005 Day ...................... G06F 16/951
709/217
7,027,975 B1 * 4/2006 Pazandak ............ G06F 16/3344
704/9
(Continued)

FOREIGN PATENT DOCUMENTS

WO 2009094654 A1 7/2009
WO 2019226189 A1 11/2019

OTHER PUBLICATIONS

PCT/US2018/051031—International Search Report and Written Opinion dated Jan. 29, 2019, 14 pages.
(Continued)

*Primary Examiner* — Mahran Y Abu Roumi
(74) *Attorney, Agent, or Firm* — Haynes Beffel & Wolfeld, LLP; Ernest J. Beffel, Jr.

(57) ABSTRACT

The technology disclosed includes a system to apply data loss prevention (DLP) to cloud-based services for which no service-specific parser is available. The system determines that a known cloud-based service is being accessed via an application programming interface (API) and no service-specific parser is available for the API being accessed. The system applies a category-directed parser to the API being accessed. The category-directed parser includes multiple category-directed match rules derived from multiple syntaxes used by numerous known providers to implement a category of service. The category-directed parser collects metadata from content being conveyed via the API and assigns the collected metadata to variables. The system invokes a DLP processor and sends the collected metadata to the DLP processor for use in focusing analysis of content being conveyed via the API.

18 Claims, 13 Drawing Sheets

(51) Int. Cl.
*G06F 9/54* (2006.01)
*H04L 29/06* (2006.01)

(58) Field of Classification Search
USPC .......................................................... 709/221
See application file for complete search history.

(56) References Cited

U.S. PATENT DOCUMENTS

| | | | | |
|---|---|---|---|---|
| 7,958,164 | B2* | 6/2011 | Ivanov | G06F 40/169 |
| | | | | 707/805 |
| 9,069,992 | B1* | 6/2015 | Vaikar | G06F 21/88 |
| 9,516,053 | B1* | 12/2016 | Muddu | G06N 5/04 |
| 10,235,533 | B1* | 3/2019 | Thoren | G06F 16/26 |
| 2010/0131616 | A1* | 5/2010 | Walter | H04L 69/08 |
| | | | | 709/219 |
| 2012/0106366 | A1* | 5/2012 | Gauvin | H04L 63/04 |
| | | | | 370/252 |
| 2012/0159503 | A1* | 6/2012 | Shafiee | G06F 9/5038 |
| | | | | 718/104 |
| 2013/0287121 | A1* | 10/2013 | Lee | H04N 21/434 |
| | | | | 375/240.26 |
| 2014/0075032 | A1* | 3/2014 | Vasudevan | H04L 41/5048 |
| | | | | 709/226 |
| 2014/0280919 | A1* | 9/2014 | Lakes | H04L 67/2814 |
| | | | | 709/224 |
| 2016/0065627 | A1* | 3/2016 | Pearl | G06F 16/14 |
| | | | | 709/204 |
| 2016/0196324 | A1* | 7/2016 | Haviv | G06F 3/0649 |
| | | | | 707/626 |
| 2016/0226888 | A1* | 8/2016 | Born | H04L 63/145 |
| 2016/0275303 | A1* | 9/2016 | Narayanaswamy | |
| | | | | H04L 63/1458 |
| 2017/0048285 | A1* | 2/2017 | Pearl | G06F 16/11 |
| 2017/0171020 | A1* | 6/2017 | Wei | G06F 11/1441 |
| 2017/0264640 | A1 | 9/2017 | Narayanaswamy et al. | |
| 2018/0027006 | A1* | 1/2018 | Zimmermann | G06F 9/46 |
| | | | | 726/11 |
| 2018/0316682 | A1* | 11/2018 | Frantz, III | G06F 16/22 |
| 2019/0034295 | A1* | 1/2019 | Bourgeois | G06F 16/125 |
| 2019/0132410 | A1* | 5/2019 | Kuzkin | H04L 67/2823 |
| 2019/0196890 | A1* | 6/2019 | Bucchi | G06F 16/24545 |
| 2019/0295011 | A1* | 9/2019 | Shi | G06F 30/20 |

OTHER PUBLICATIONS

U.S. Appl. No. 15/986,732—Pre Interview First Office Action dated Oct. 19, 2019, 9 pages.
EP 18789283.1—First Office Action dated Oct. 8, 2019, 5 pages.
"50 Successful Blogs in Every Topic Imaginable", Sparrringmind.com, 34 pages, (downloaded Mar. 26, 2020 from https://web.archive.org/web/20181204131618/https://www.sparringmind.com/successful-blogs).
"Data Loss Prevention and Monitoring in the Cloud" by netSkope, Inc., Nov. 2014, 18 pgs.
"The 5 Steps to Cloud Confidence," netSkope, Inc., 2014, 11 pgs.
"Netskope Active Cloud DLP," netSkope, Inc., 2015, 4 pgs.
"Repave the Cloud-Data Breach Collision Course," netSkope, Inc., 2014, 6 pgs.
"Netskope Cloud Confidence Index™," netSkope, Inc., 2015, 2 pgs.
EP 18789283.1—Intention to Grant dated Mar. 2, 2020, 9 pages.
U.S. Appl. No. 15/986,732—Response to Pre Interview First Office Action dated Oct. 19, 2019, filed Dec. 5, 2019, 20 pages.
U.S. Appl. No. 15/986,732—Office Action dated Jan. 31, 2020, 24 pages.
U.S. Appl. No. 15/986,732—Office Action dated May 13, 2020, 23 pages.
U.S. Appl. No. 15/986,732—Office Action dated Nov. 20, 2020, 30 pages.
JP 2019-537825—Notice of Allowance dated Jul. 7, 2020, 5 pages.
EP 18789283.1—Decision o Grant dated Aug. 13, 2020, 2 pages.
U.S. Appl. No. 15/986,732—Response to Office Action dated Nov. 20, 2020, filed Feb. 22, 2021, 9 pages.

* cited by examiner

400

411 {
- General
- Request URL:[https://test951342056.wordpress.com/wp-comments-post.php]~418
- Request Method:POST
- Status Code:302 ~415
- Remote Address:192.0.78.13:443
- Referrer Policy:no-referrer-when-downgrade 431 {
- Response Headers
- server:nginx
- date:Thu, 08 Mar 2018 22:00:09 GMT
- location:https://test951342056.wordpress.com/2018/03/08/the-journey-begins/comment-page-1/#comment-1

461 {
- Request Headers
- :authority:test951342056.wordpress.com
- [method:POST]~453
- :path:/wp-comments-post.php
- :scheme:https
- content-length:157
- content-type:[application/x-www-form-urlencoded]~466
- cookie:__utma=11735858.1091384840.1489685003.1489685003.1497219339.2; dcmsid=w8YssOlNeQplJIzRp...
- origin:https://test951342056.wordpress.com
- user-agent:Mozilla/5.0 (Linux; Android 6.0; Nexus 5 Build/MRA58N)

481 {
- Form Data
- comment:[Your post is very informative, thank you.]~474
- submit:Post Comment
- comment_post_ID:3
- comment_parent:0
- akismet_comment_nonce:f36a604783
- genseq:1520546372
- ak_js:1520546313480

Request Headers
:authority:test951342056.wordpress.com
:method:POST —453
:path:/wp-comments-post.php
:scheme:https
content-length:157
content-type:application/x-www-form-urlencoded —466
cookie:__utma=11735858.1091384840.1489685003.1497219339.2; dcmsid=w8YssOINeQpIJIzRp…
origin:https://test951342056.wordpress.com
user-agent:Mozilla/5.0 (Linux; Android 6.0; Nexus 5 Build/MRA58N)

461

601

PersonalPagesAndBlogs Category-directed parser
650 — <Header Match Segment>
  663
662 — <Field Name:literal> <Match Type: enumeration> <Value to Match:literal>
                                                        667
  <Boolean logic relating match statements> — 672
                                    686
682 — <Field Name:literal> <Match Type: enumeration> <Key to match: list> <Value to Match:literal>
690 — <end of Match Segment>

Form Data
{ comment:This is a test comment. ~474
submit:Post Comment
comment_post_ID:3
comment_parent:0
akismet_comment_nonce:f36a604783
genseq:1520546372
ak_js:1520546313480 }
481

603

PersonalPagesAndBlogs Category-directed parser

<Assignment Segment> ~642

<Sequence:value> <Field Name:literal> <Assignment Type: enumeration> [<Key to match:literal>] <Variable:name>
<Sequence:value> <Field Name:literal> <Assignment Type: enumeration> [<Key to match:literal>] <Variable:name>
<Sequence:value> <Field Name:literal> <Assignment Type: enumeration> [<Key to match:literal>] <Variable:name>
<Sequence:value> <Field Name:literal> <Assignment Type: enumeration> [<Key to match:literal>] <Variable:name>
                                              684                    687                689
...
680
614

<end of Assignment Segment> ~692

FIG. 6C

UNIVERSAL CONNECTORS FOR CLOUD DATA LOSS PREVENTION (DLP)

PRIORITY APPLICATIONS

This application is a continuation of U.S. application Ser. No. 15/986,732, entitled "DATA LOSS PREVENTION USING CATEGORY-DIRECTED PARSERS," filed on May 22, 2018

INCORPORATIONS

The following materials are incorporated by reference as if fully set forth herein:

U.S. Nonprovisional patent application Ser. No. 14/198,499, entitled "SECURITY FOR NETWORK DELIVERED SERVICES", filed on Mar. 5, 2014 (now U.S. Pat. No. 9,398,102 issued on Jul. 19, 2016);

U.S. Nonprovisional patent application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015;

U.S. Nonprovisional patent application Ser. No. 15/368,240, entitled "SYSTEMS AND METHODS OF ENFORCING MULTI-PART POLICIES ON DATA-DEFICIENT TRANSACTIONS OF CLOUD COMPUTING SERVICES", filed on Dec. 2, 2016;

"Data Loss Prevention and Monitoring in the Cloud" by netSkope, Inc.;

"The 5 Steps to Cloud Confidence" by netSkope, Inc.;

"Netskope Active Cloud DLP" by netSkope, Inc.;

"Repave the Cloud-Data Breach Collision Course" by netSkope, Inc.; and

"Netskope Cloud Confidence Index™" by netSkope, Inc.

FIELD OF THE TECHNOLOGY DISCLOSED

The technology disclosed relates to applying data loss prevention to cloud-based services for which no service-specific parser is available.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud-based services for a number of corporate functions is now common. Thus, instead of installing servers within a corporate network to run a customer relationship management (CRM) software product, a software as a service (SaaS) solution such as Salesforce.com's offerings can be used. The information technology (IT) and network architecture approaches that could log and protect access to a classic solution provide limited control.

Data is often the lifeblood of any business and it is critical that it is effectively managed, protected, and meets compliance needs. Protecting data in the past was focused primarily on on-premise scenarios, but now with the increased adoption of cloud-based services, companies of all sizes are now relying on the cloud to create, edit, and store data. This presents new challenges. Despite its benefits, the cloud also makes it easy for people to lose sensitive corporate data. For one thing, people can access cloud services from multiple devices more easily. Another is that the cloud services make it easy to share data, including with people outside of an organization. For these reasons, it is easy for data to get out of an organization's control.

Also, as the number of cloud-based services increases exponentially, there are hundreds of ways data can leak. Different cloud-based services provide different services to the users. For example using a CRM cloud-based service an employee can manage accounts, view opportunities and generate reports. With appropriate credentials, the employee can download and store generated reports on a cloud-based storage service. The employee can share downloaded reports and other corporate documents with people outside their organization. Employees might attach a wrong file while sending emails, hit the send button too early, not be careful when rushing to a deadline, or share data and collaborate with people outside of their organization.

An opportunity arises to provide consistent, centrally administered control, e.g. enforce the same policy across multiple devices, network services, and networks—including corporate networks to protect sensitive information such as intellectual property, non-public financials, strategic plans, customer lists, personally identifiable information belonging to customers or employees, and the like.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 4 presents an example message data, comprising header and content parts, to post a comment to a provider of cloud-based service in "personal pages and blogs" category.

FIG. 6A illustrates a portion of a computer program code from an example category-directed parser to collect header metadata in the message data of FIG. 4.

FIG. 6C presents a third portion of computer program code from an example category-directed parser to store content identified in FIG. 6B to a system variable.

DETAILED DESCRIPTION

Figure 1:
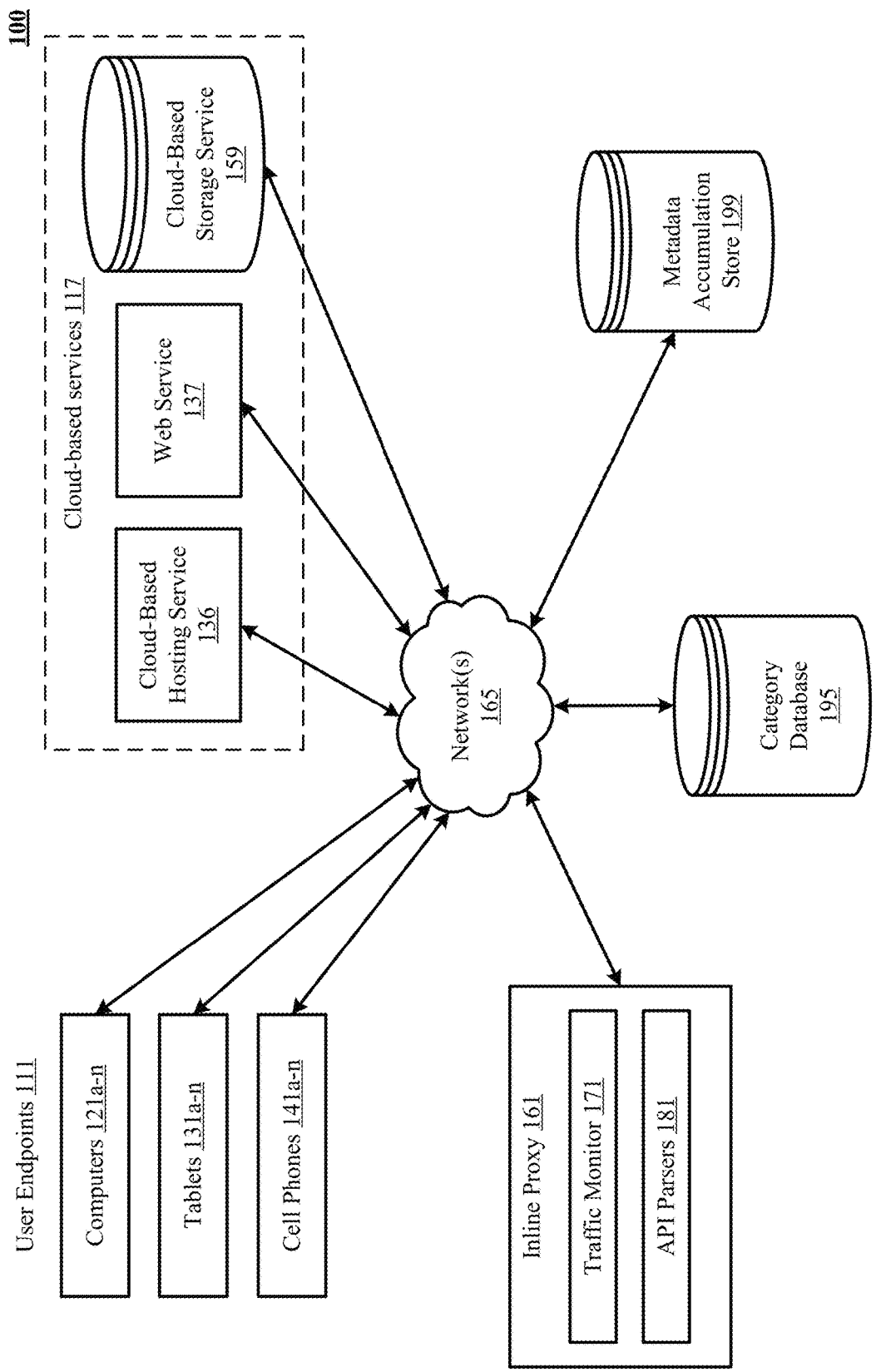
FIG. 1 illustrates an architectural level schematic of a system in which an inline proxy monitors and parses network traffic between users of an enterprise network and cloud-based services to prevent data loss.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Enterprise users access multiple cloud-based services to perform a variety of activities related to products and services. For example, a user can access a cloud-based customer relationship management (CRM) system API such as Salesforce.com™ to generate a report of open sales opportunities. The user can download the report to an endpoint such as a computer or a mobile device. Following this, the user can share the report with other users by uploading it to a cloud-based storage service such as Box™. Monitoring of these interactions is part of a data loss prevention program. Proliferation of cloud-based services makes it difficult to develop service-specific parsers customized to monitor the syntax of each new cloud-based service.

The users' transactions with cloud-based services transpire between enterprise endpoints and servers of the cloud-based services. A proxy positioned between the endpoints and the cloud-based services monitors the transactions. The proxy intercepts and parses a message between an endpoint and a server. It determines which cloud-based service application programming interface (API) is being accessed and applies a parser (also known as a connector) to collect metadata.

Applying the technology disclosed, known cloud-based services are arranged in categories of services such as "personal pages and blog", "news websites", "cloud-based storage services", and "social media services". A category includes a list of uniform resource locators (URLs) of providers of cloud-based services that allow users to perform similar activities. For example, providers in a "personal pages and blogs" category of service allow users to create posts, comment on posts, upload or embed pictures and multimedia, moderate, publish RSS (rich site summary) feeds, etc. For widely used providers, such as Salesforce.com™ and Box™ service-specific parsers are provided that collect metadata. However, due to a large number of providers of known cloud-based services, there are many known providers for which no service-specific parser is available.

The various providers in a category use different syntaxes to implement services in the category. Applying the technology disclosed, category-directed parsers synthesize interaction syntax patterns of a sample of providers in the category. The category-directed parser collects metadata from known cloud-based services using multiple category-directed match rules synthesized from syntaxes used by the sample providers in the category. The metadata collected by the category-directed parser enables the DLP processor to focus analysis of the content being conveyed via the API. In this application, "content", as in user content, content conveyed by API, or content storage, refers to both header and body data. Sometimes, "contents" is used in a narrower way, to refer to a payload or body of a message. The difference between these terms is evident from usage.

Even category-based parsers do not span the entire universe of services. A user may access an unknown cloud-based service via an API for which no specific or category-directed parser is available. When the proxy determines that an unknown cloud-based service is being accessed, to which no category is assigned or for which no category-specific parser is available, a generic parser is selected to collect metadata from the content being conveyed via the API. The generic parser uses default match rules to collect metadata from the content being conveyed via the API. When the proxy uses a generic parser to collect metadata from the content, the DLP processor is informed that the metadata is collected by a generic parser. This guides tradeoffs between precision and recall.

System Overview

We describe a system and various implementations for applying data loss prevention (DLP) to cloud-based content storage and hosting services (collectively, "cloud-based services") for which no service specific parser is available. FIG. 1 shows an architectural level schematic of a system in accordance with an implementation. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes user endpoints 111, a cloud-based hosting service 136, a web service 137, a cloud-based storage service 159, a metadata accumulation store 199, a category database 195, an inline proxy 161, and a network(s) 165. Cloud-based hosting services 136, web services 137, and cloud-based storage services 159 are collectively referred to as cloud-based services 117.

User endpoints 111 such as computers 121*a-n*, tablets 131*a-n*, and cell phones 141*a-n* access and interact with data stored on the cloud-based services 117. This access and interaction is modulated by an inline proxy 161 that is interposed between the user endpoints and the cloud-based services 117. The inline proxy 161 uses a traffic monitor 171 and API (application programming interface) parsers 181 to monitor traffic between the user endpoints 111 and the cloud-based services 117. The inline proxy 161 can be a cloud-based proxy or located on premise.

In a "managed device" implementation, user endpoints 111 are configured with routing agents (not shown) which ensure that requests for the cloud-based services 117 originating from the user endpoints 111 and responses to the requests are routed through the inline proxy 161 for policy enforcement. Once the user endpoints 111 are configured with the routing agents, they are under the ambit or purview of the inline proxy 161, regardless of their location (on premise or off premise).

In an "unmanaged device" implementation, certain user endpoints that are not configured with the routing agents can still be under the purview of the inline proxy 161 when they are operating in an on premise network monitored by the inline proxy 161.

The interconnection of the elements of system 100 will now be described. The network(s) 165, couples the computers 121a-n, the tablets 131a-n, the cell phones 141a-n, the cloud-based services 117, the metadata store 199, the category database 195, and the inline proxy 161, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

The cloud-based services 117 provide functionality to users that is implemented in the cloud or on the Internet. The cloud-based services 117 can include Internet hosted services such as news websites, blogs, video streaming websites, social media websites, hosted services, cloud applications, cloud stores, cloud collaboration and messaging platforms, and/or cloud customer relationship management (CRM) platforms. Cloud-based services 117 can be accessed using a browser (e.g., via a URL) or a native application (e.g., a sync client). Categories of cloud-based services include software-as-a-service (SaaS) offerings, platform-as-a-service (PaaS) offerings, and infrastructure-as-a-service (IaaS) offerings. Enterprise applications exposed via URLs/APIs can fit in a category of service supported by a category-directed parser or a category-directed parser could be written for an enterprise applications category of service. Examples of common web services today include YouTube™, Facebook™, Twitter™, Google™, LinkedIn™ Wikipedia™, Yahoo™, Baidu™, Amazon™, MSN™, Pinterest™, Taobao™, Instagram™, Tumblr™, eBay™, Hotmail™, Reddit™, IMDb™, Netflix™, PayPal™, Imgur™, Snapchat™, Yammer™, Skype™, Slack™, HipChat™, Confluence™, TeamDrive™, Taskworld™, Chatter™, Zoho™, ProsperWorks™, Google's Gmail™, Salesforce.com™, Box™, Dropbox™, Google Apps™, Amazon AWS™, Microsoft Office 365™, Workday™, Oracle on Demand™, Taleo™, Jive™, and Concur™.

The users belonging to the organization access hundreds of providers of cloud-based services to generate, store, collaborate and share data with other users inside or outside of the organization. The known cloud-based services are arranged in categories providing distinct categories of service. For example the providers belonging to "personal pages and blogs" category of service allow users to create posts on their personal pages, comments on posts, upload or embed pictures and multimedia, moderate comments from users, publish RSS feeds, etc. A few examples of providers of cloud-based service in "personal pages and blogs" category include Google Plus™, Blogger™, Squarespace™, Wix™ and Wordpress™. A category of service includes numerous known providers that can range from tens to thousands of providers, or more, depending on the popularity of the category of service. In one implementation, there are at least twenty-five known providers that each implement the category of service. Twenty-five is an approximate estimate of minimum number of providers in a category. An example list of fifty providers in the "blogs and personal pages" category is available in the article "50 Successful Blogs in Every Topic Imaginable" from the top level URL sparringmind.com. Other examples of distinct categories of services of known-cloud based services include "news websites", "cloud-based storage services", "social media services", and "webmail". More than fifty distinct categories of services of known cloud-based services have been identified. The examples include: technology, education, health and nutrition, travel, home and garden, automotive, professional networking, auctions and market places, science, and fashion. A person skilled in the art will appreciate that additional categories of service can be applied to other present or future-developed cloud-based services without departing from the spirit and scope of the technology disclosed.

The categories of services and providers of cloud-based services per category are stored in the category database 195. The cloud-based services in the above listed five example categories of service are served by at least five category-directed parsers with one category-directed parser addressing a specific category of service.

The cloud-based services 117 provide functionality to the users of the organization that is implementing security policies. When a user sends a request to a cloud-based service via an endpoint 121a, the inline proxy 161 intercepts the request message. The inline proxy 161 queries the category database 195 to identify the cloud-based service being accessed via an application programming interface (API). In one implementation, the inline proxy 161 uses a domain name in a uniform resource locator used to access the API to identify the cloud-based service being accessed. If no service specific parser is available for the API being accessed, the inline proxy 161 applies a category-directed parser to the API being accessed. The metadata collected from content being conveyed via the API is collected by the category-directed parser. The metadata is passed to a data loss prevention (DLP) processor to focus analysis of the content being conveyed via the API. The inline proxy accumulates the metadata in request messages from the user to metadata accumulation store 199. The accumulation of metadata helps in building a larger context regarding the interactions of the user with the cloud-based services which helps the DLP processor to focus its analysis.

Figure 2:
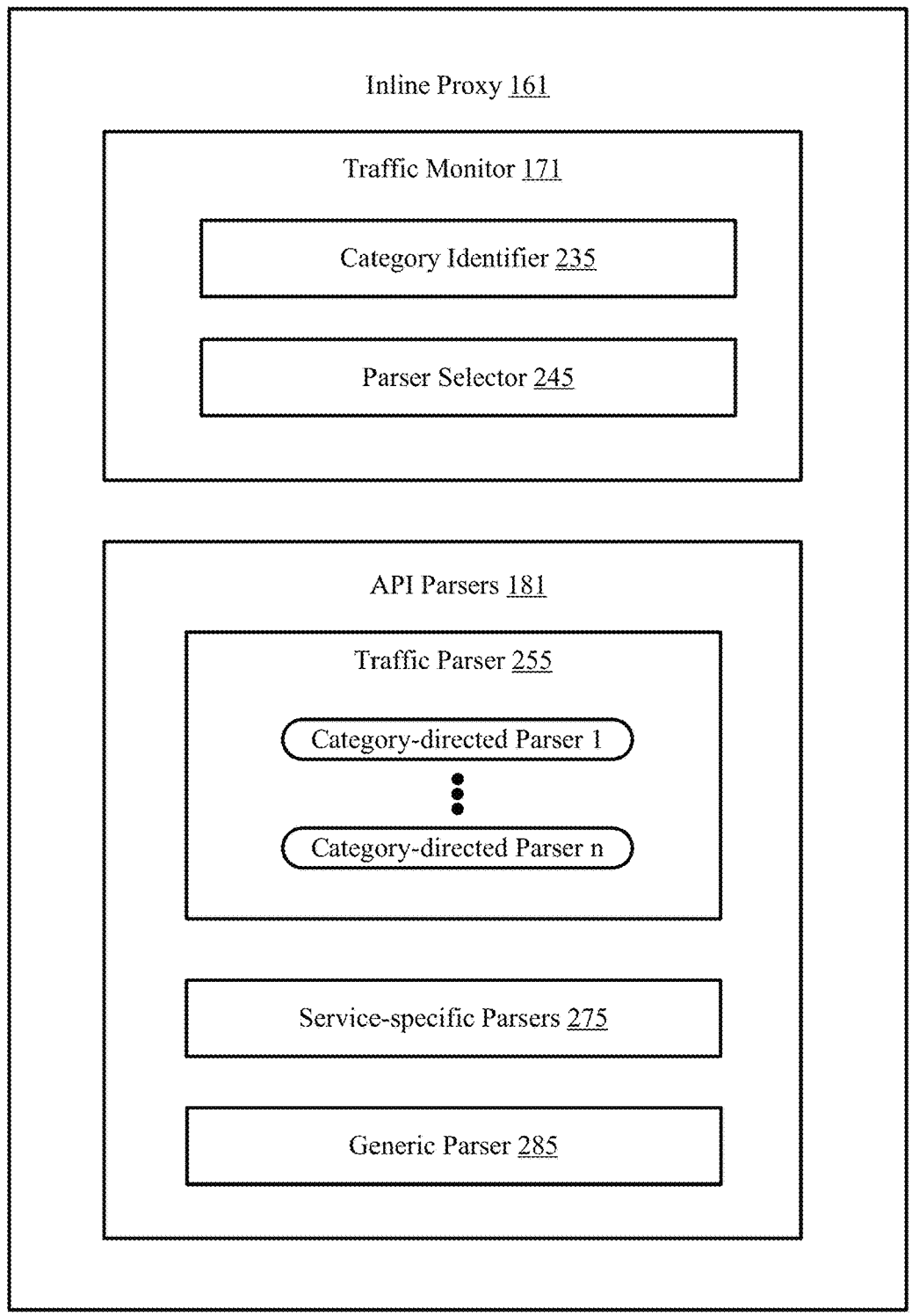
FIG. 2 is a block diagram of subsystem components of the inline proxy of FIG. 1.

FIG. 2 is a block diagram 200 illustrating subsystem components of the inline proxy 161. The inline proxy 161 includes the traffic monitor 171 and the API parsers 181. The inline proxy receives a request message from the user via a client running on the endpoint such as a computer 121a, a tablet 131a, or a cell phone 141a to access a cloud-based service 117. In one implementation, the communication between the client and the server of the cloud-based service uses Hypertext Transfer (HTTP) Protocol. After the receipt of the request, the inline proxy 161, establishes a connection to the server on behalf of the requesting client. Following this, all the request messages from the client to the server and response messages from the server to the client are inspected by the proxy 161 and passed to the DLP processor to enforce policies for data loss prevention. The device running the inline proxy 161 can be a cloud-based server to which an endpoint routing client, running on a same device from which the HTTP requests originated, routes the HTTP requests. In another implementation, the device running the inline proxy 161 is an on-premise routing appliance positioned to actively process the HTTP requests from the user endpoints 111.

For example, consider the user is posting a comment on a blog post, the request URL is "test951342056.wordpress.com/wp-comments-post.php", thus the domain name (also referred to as host name) is "wordpress.com". Using the domain name, a category identifier component 235 queries the category database 195 and determines that a known cloud-based service, "WordPress™", belonging to the "personal pages and blogs" category is being accessed via the API. Following this, a parser selector 245 determines whether a service-specific parser 275 is available for the API being accessed. If no service specific parser is available for the API being accessed, the parser selector 245, selects a category-directed parser serving the cloud-based services in the "personal pages and blogs" category of service from a traffic parser component 255.

When a user attempts to access an unknown cloud-based service, the inline proxy uses a generic parser 285 to collect metadata from the API being accessed. A cloud-based service is referred to as an unknown cloud-based service if no service specific parser is available to collect metadata from the content being conveyed via its API. Furthermore, no category-directed parser is available for collecting metadata from the content being conveyed via the API as unknown cloud-based service does not belong to any category of service. Thus, the generic parser 285 collects metadata from the content being conveyed via the API of the unknown cloud-based service.

Selection of Category-Directed and Generic Parsers

The inline proxy 161 receives requests from enterprise user via the client running on the endpoint and establishes a connection to the requested cloud-based service on behalf of the client. Following the establishment of the connection, the inline proxy determines whether a known cloud-based service is being accessed via the API. FIGS. 3A to 3D present three examples of selection and identification of a parser (also referred to as a connector) when known and unknown cloud-based services are accessed via their respective APIs.

Figure 3A:
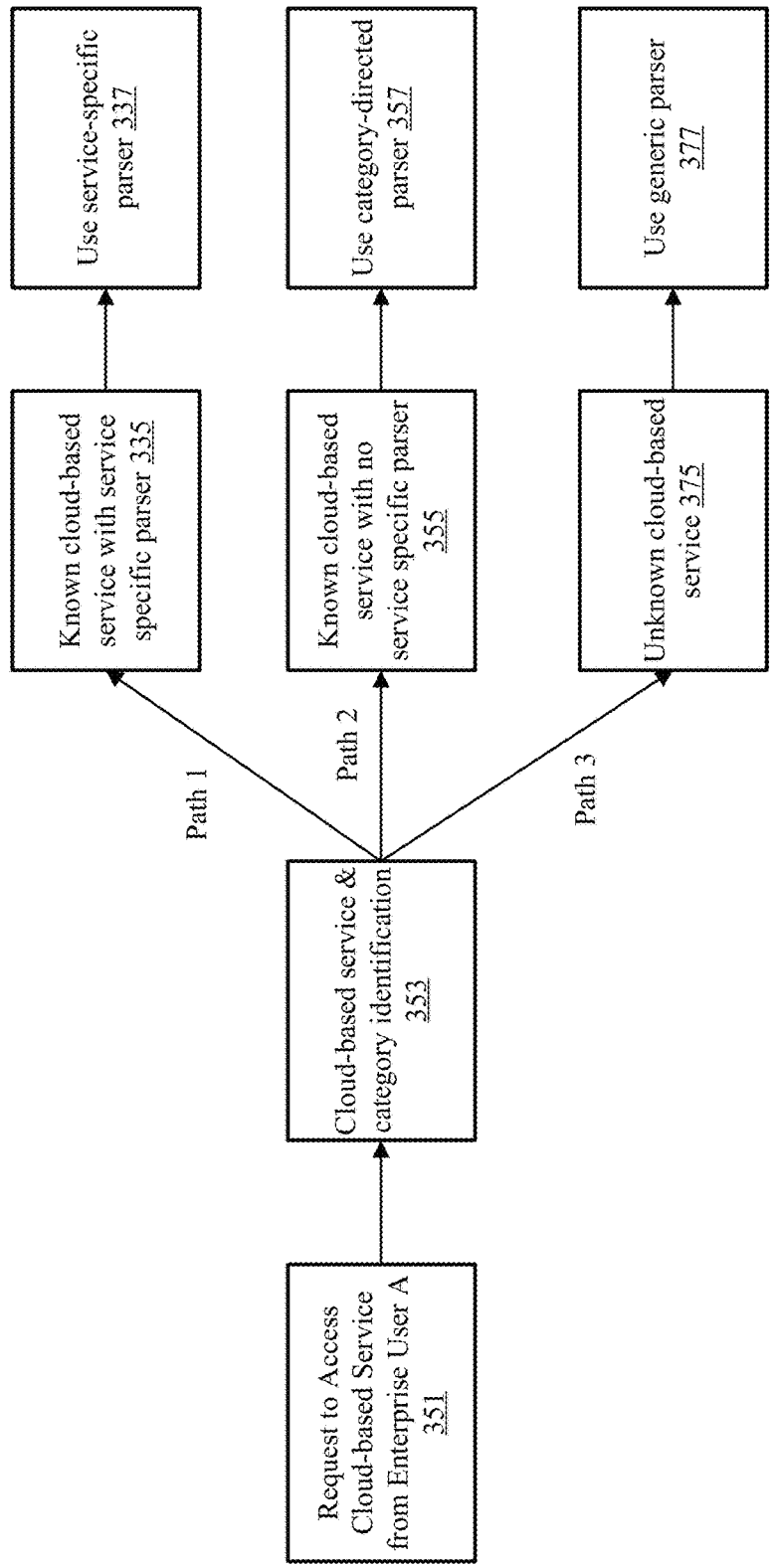
FIG. 3A illustrates high level process steps to determine a cloud-based service being accessed by an enterprise user and selection of an appropriate parser.

FIG. 3A presents an overview 300A of the process in which an inline proxy 161 receives a request from an enterprise user A at a block 351 (via a client on the endpoint) to access a cloud-based service. The inline proxy 161 determines whether a known or an unknown cloud-based service is being accessed and a category of service implemented by the known cloud-based service (block 353). Following this determination by the inline proxy, three paths are possible leading to selection of three different types of parsers. In the following examples, the communication between the client and the server of the cloud-based service uses HTTP protocol.

Figure 3B:
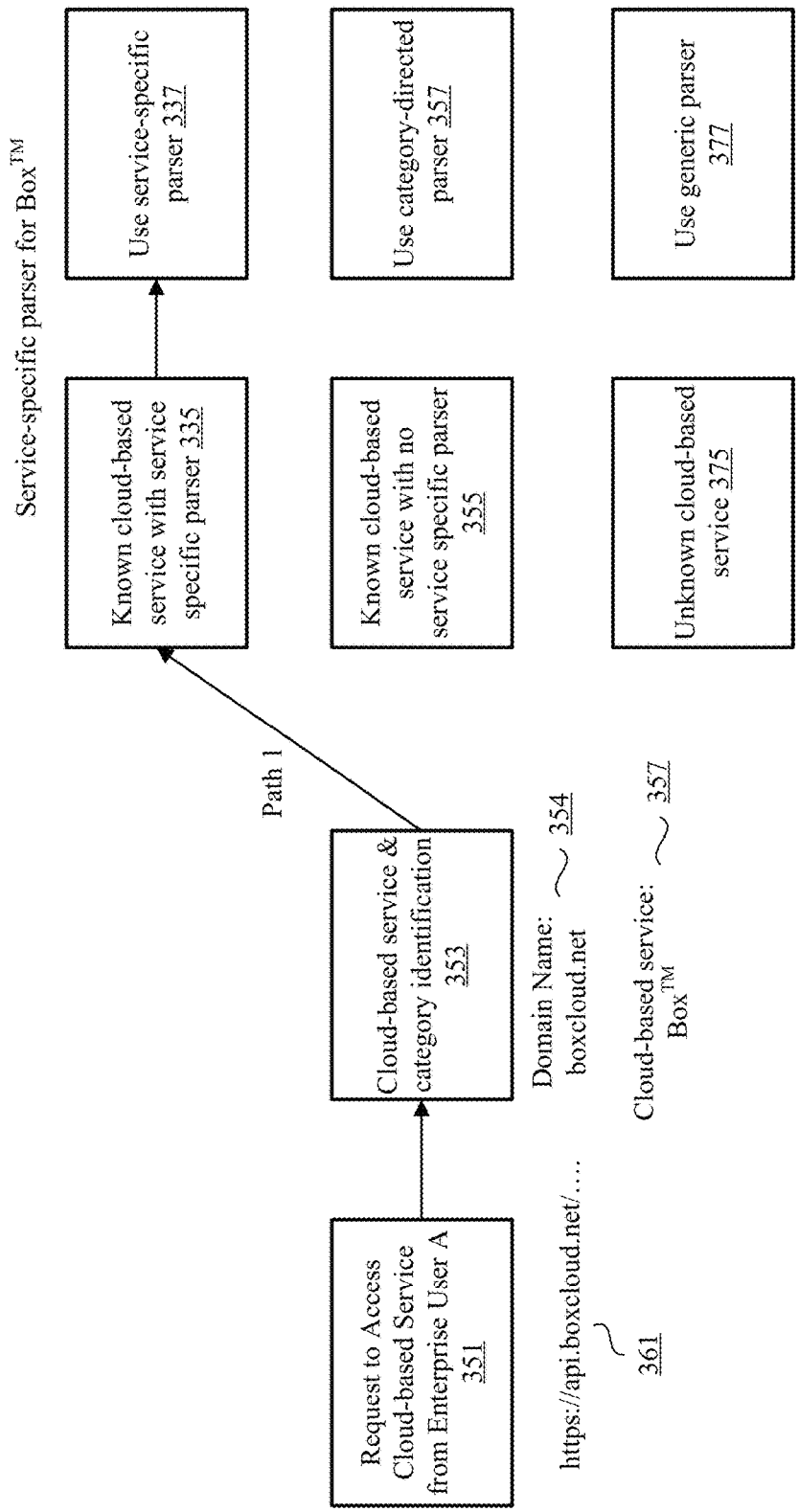
FIG. 3B presents a first scenario in which a known cloud-based service is being accessed for which a service-specific parsers is available.

FIG. 3B illustrates an example 300B in which the URL received by the inline proxy in the request message from the client is "api.boxcloud.net/ . . . ." (361). The request URL is partially shown for illustration purposes. A domain name "boxcloud.net" 354 and a cloud-based service "Box™" 357 is determined by the inline proxy from the request URL 361. The inline proxy queries the category database 195 and determines that a service specific parser is available for the API being accessed (block 335). In one implementation, the category database 195 maintains an entry list of domain names of providers of known cloud-based services. The entry list identifies a service-specific parser available for the provider. Following this, the inline proxy selects the service-specific parser for the Box™ API and applies it to the request message to collect metadata from the content being conveyed via the API (block 337). The collected metadata is passed to the DLP for use in focusing analysis of content being conveyed via the API.

Figure 3C:
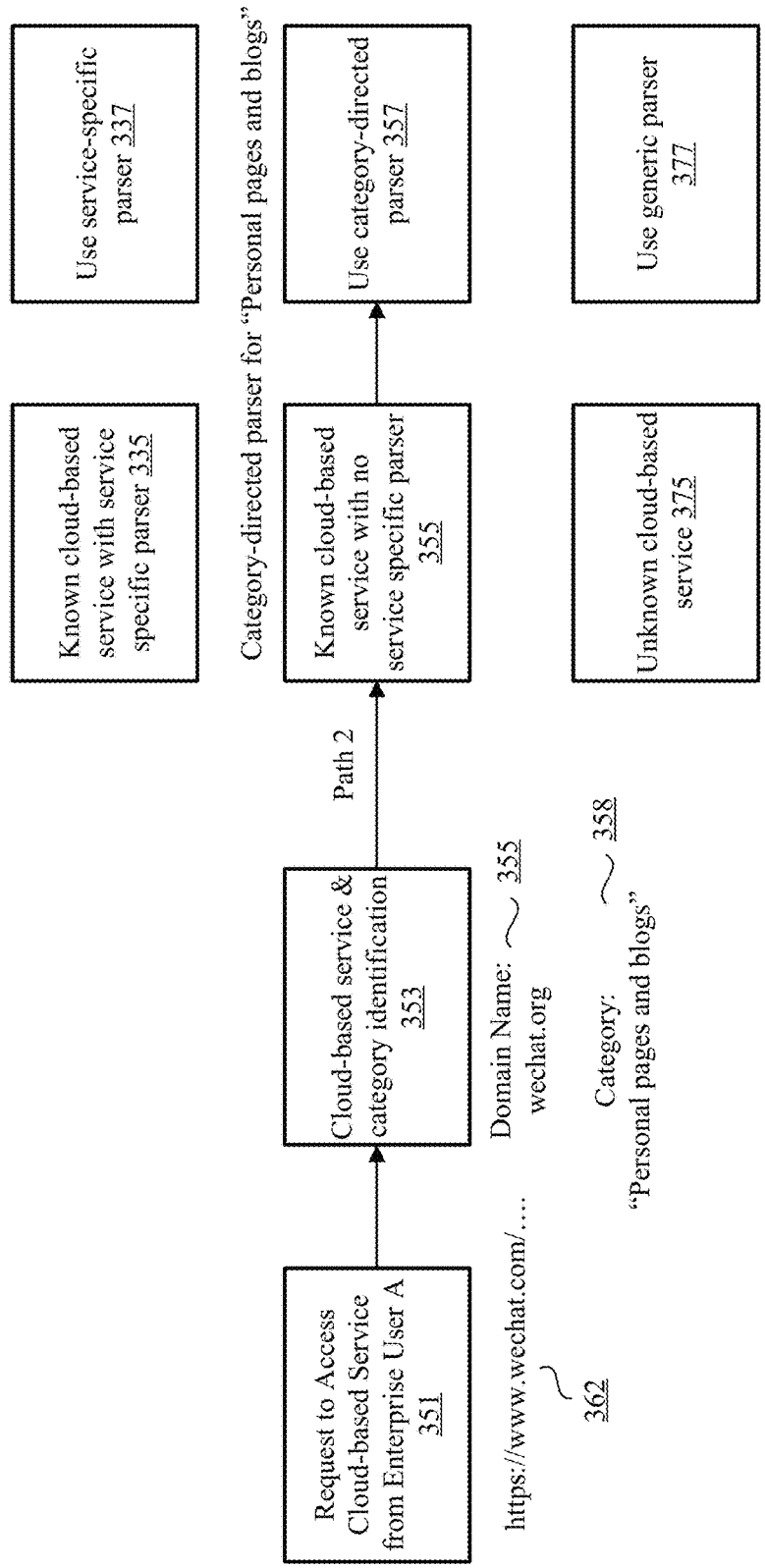
FIG. 3C illustrates a second scenario in which a known cloud-based service is being accessed for which a service-specific parser is not available.

In the example 300C shown in FIG. 3C, the URL in the request message is "www.wechat.com/ . . . ." (362). The inline proxy determines that the domain name and category of service implemented by the requested cloud-based service are "wechat.com" (355) and it belongs to "personal pages and blogs" category 358. As there is no service-specific parser available for the provider. The inline proxy selects and applies the "personal pages and blogs" category-directed parser (block 357) to collect metadata from the content being conveyed via the API. The collected metadata is sent to the DLP processor for use in focusing analysis of content being conveyed via the API. The examples of cloud-based services presented in FIGS. 3B and 3C are known cloud-based services for which a service-specific or a category-directed parser is available. In another implementation, a path identifying a resource in the host is used to select the category-directed parser. For example, consider a URL "mysite.com/forums" in the request message. The resource part of the URL "/forums" is used to determine that the category of service implemented by the requested cloud-based service belongs to "personal pages and blogs" category. This can be most helpful if mysite.com provides services that are handled by two different category-directed parsers. Following the identification of the category, the category-directed parser is selected as described above.

Figure 3D:
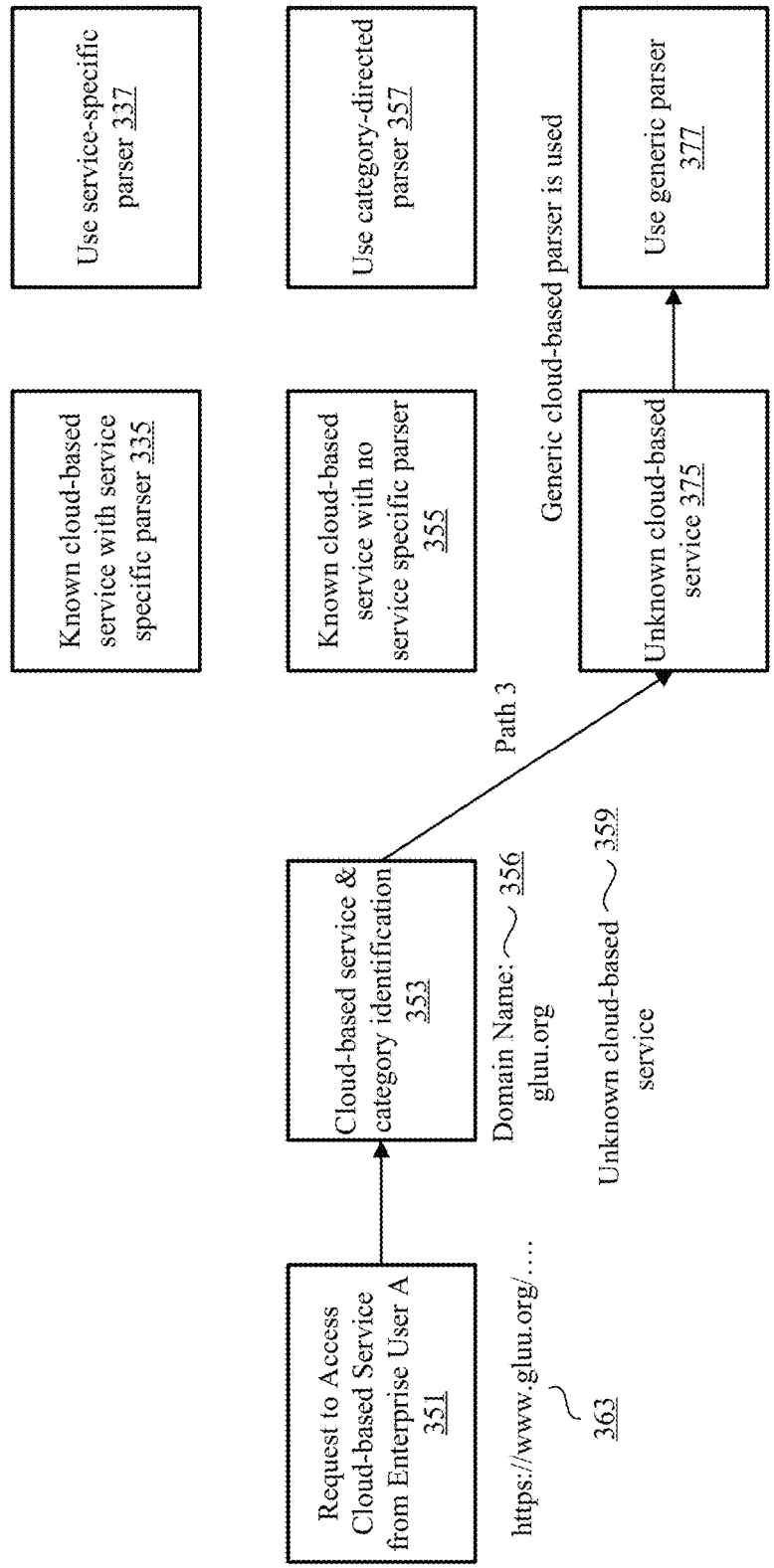
FIG. 3D presents a third scenario in which an unknown cloud-based service is being accessed.

In the example 300D, illustrated in FIG. 3D, the URL 363 in the request message is "www.gluu.org/ . . . .". The inline proxy determines that the domain name of the cloud-based service being accessed is "gluu.org" (356). However, the inline proxy determines that this is an unknown cloud-based service (359) as there is no service-specific parser or category-directed parser available to collect metadata from the API being accessed. New providers of cloud-based services or infrequently accessed providers of cloud-based services are likely to fall in this category of cloud-based services (block 375). The inline proxy 161 applies a generic parser to the API of the unknown cloud-based service (block 377).

Request Message from a Client to a Server of a Cloud-Based Service

FIG. 4 presents an example HTTP request message 400 from a client to a server of a cloud-based service 117. The request message comprises of four main parts: general headers 411, response headers 431, request headers 461 and form data 481. The first three parts contain header fields providing information about the sender, receiver and the message contents. The general headers 411 apply to both HTTP request and HTTP response messages. This part includes a request URL 418, further comprising of a domain name 415 of the cloud-based service being accessed. The request headers 461 include more information about the client or the resource to be accessed. The request method is "POST" as indicated by a label 453. The HTTP POST request method requests that a web server accept the data enclosed in the body of the request message for storing it. The POST method is used when submitting a completed web form or uploading a file to a cloud-based storage service. The content-type field 466 in the request headers 461 identifies that the values in the request message are encoded in key-value tuples. The response headers 431 contain additional information about the response such as location and name of server. The last part of the message is form data 481 which includes the contents or payload in the request message. In the example request message 400, the user is posting a comment 474 "Your post is very informative, thank you." on a blog post.

Figure 5A:
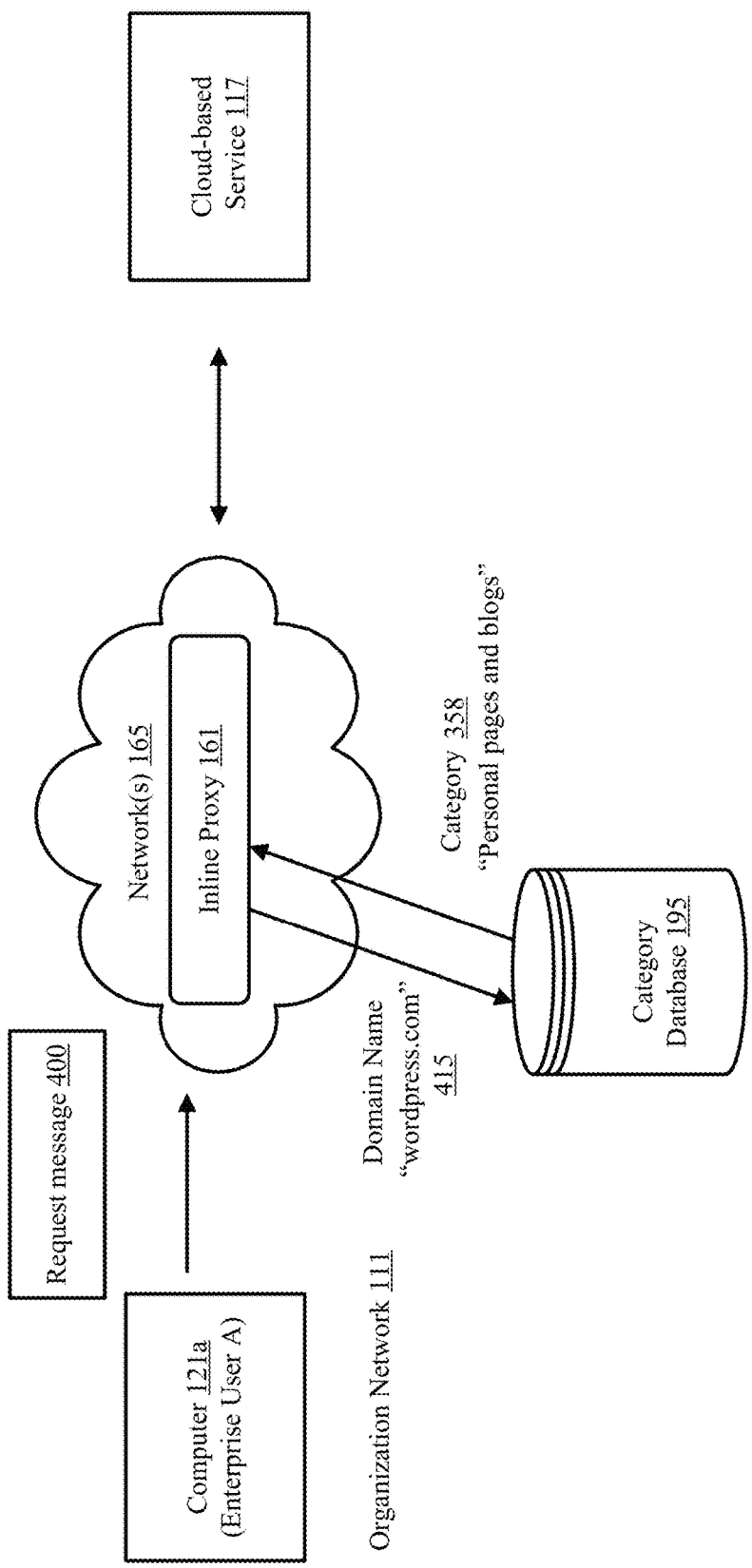
FIG. 5A illustrates an inline proxy identifying a category of the cloud-based service by querying a category database.
Figure 5B:
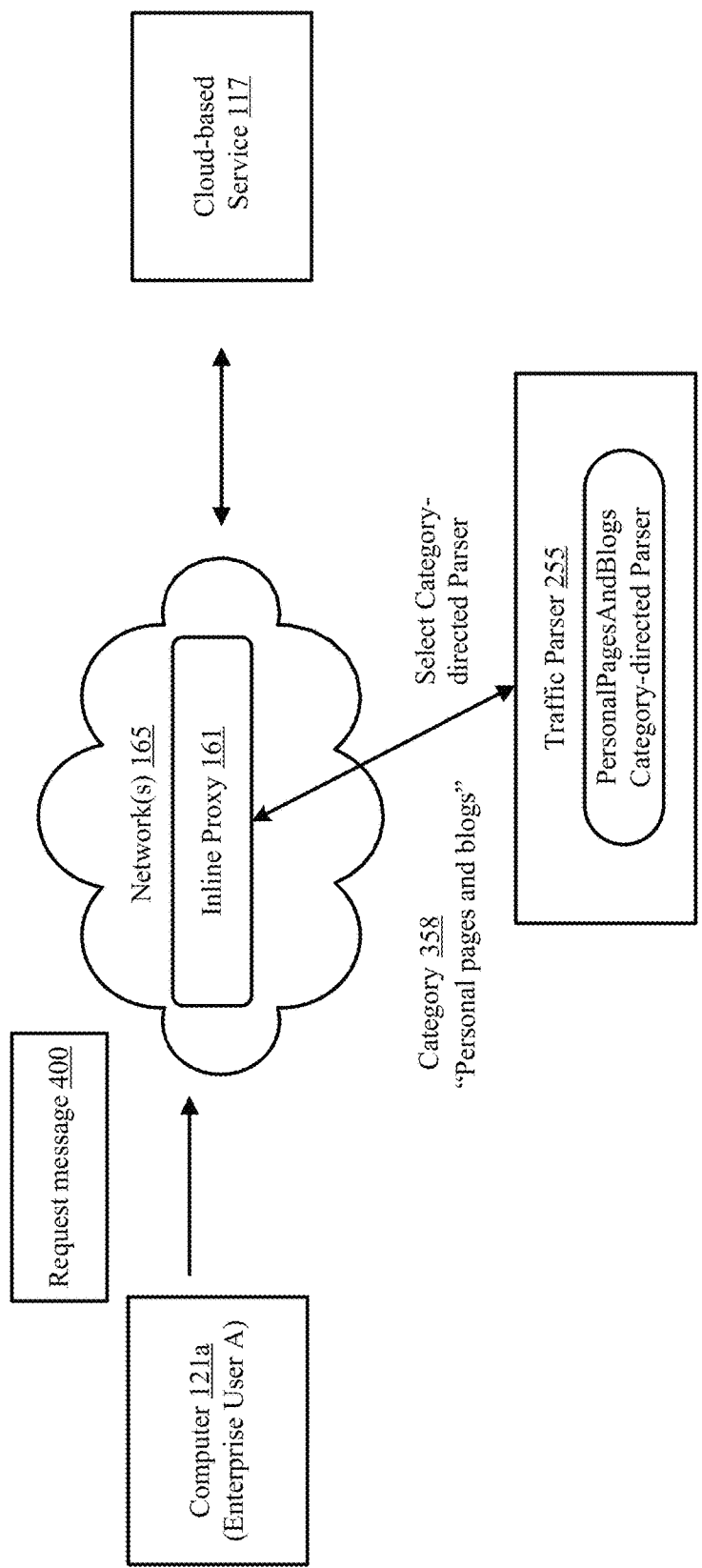
FIG. 5B shows a selected category-directed parser to collect metadata from content being conveyed to the cloud-based service of FIG. 5A.

Having described the structure of an example request message 400, we now explain the selection of a category-directed parser by the inline proxy 161 using information in the request message 400. FIGS. 5A, and 5B illustrate one implementation of the inline proxy 161. The analysis performed by the inline proxy 161 can be implemented at least partially with a computer or other data processing system, e.g., by one or more processors configured to receive or retrieve information, process the information, store results, and transmit the results. Other implementations may perform the results in different orders and/or with different, fewer or additional actions than those illustrated.

The inline proxy 161 is interposed between the user endpoints 111 and the cloud-based services 117 (including cloud-based hosting service 136 and the storage service 159). The inline proxy 161 monitors web browser traffic from users' endpoints (such as computers 121*a-n*, tablets 131*a-n*, and cell phones 141*a-n*). Upon receiving a request from a user's endpoint, the inline proxy 161 establishes a connection to the server on behalf of the requesting client. Thus, the inline proxy 161 monitors in real time, the request and response messages including any documents downloaded from and uploaded to the cloud-based service. In one implementation, the inline proxy 161 is an HTTP (hypertext transfer protocol) proxy, inspecting request and response messages in HTTP transactions.

FIG. 5A illustrates an example 500A in which an enterprise user A sends a request message 400 to the cloud-based service 117 (via computer 121*a*) to post a comment on a blog post. The inline proxy 161 parses the request URL 418 in the request message 400 to identify the domain name "wordpress.com" 415. The inline proxy 161 queries the category database 195 to determine that the requested cloud-based service "wordpress.com" belongs to the "personal pages and blogs" category of service 358. The inline proxy 161 further identifies that there is no service-specific parser for the API of the cloud-based service "wordpress.com" being accessed. FIG. 5B illustrates selection of the category directed parser addressing the category of service of the requested cloud-based service. The inline proxy 161 selects the "PersonalPagesAndBlogs" category-directed parser which serves the providers of cloud-based services belonging to "personal pages and blogs" category of service from the available category-directed parsers in the traffic parser component 255.

Category-Directed Parsers

After describing the selection of the category-directed parser, we now present application of the category-directed parser to the request message 400. A category-directed parser (also referred to as a connector) parses the request and the response messages and attempts to identify the activity being performed e.g., "login", "file upload", "file download". A user can perform many activities related to the services provided by the cloud-based service. Following the identification of the activity, the category-directed parser collects metadata related to the activity to send to the DLP processor for use in focusing analysis of content being conveyed via the API.

Figure 6B:
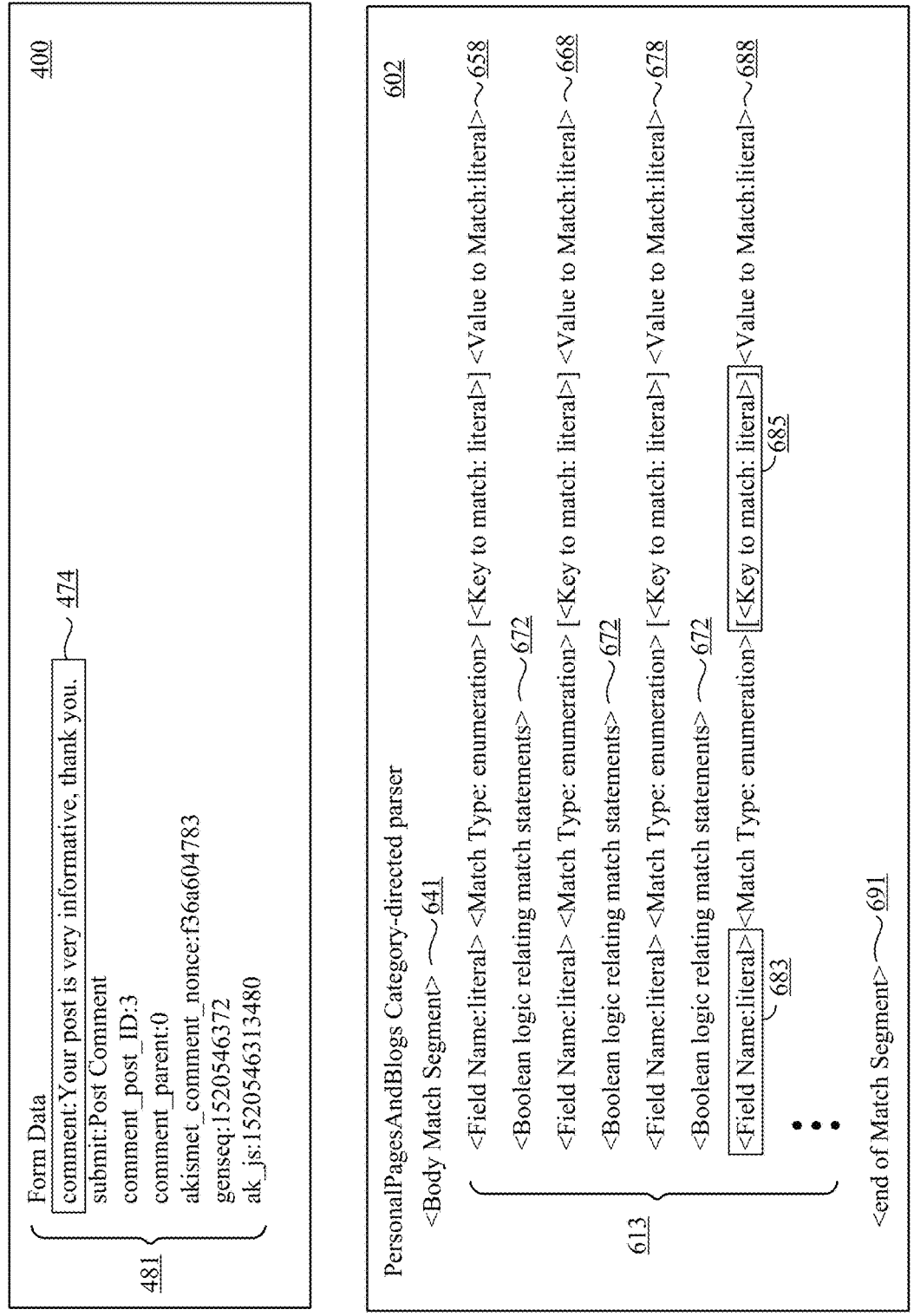
FIG. 6B shows a second portion of a computer program code from an example category-directed parser to identify content being conveyed in the example message data of FIG. 4.

A specific-parser includes the logic to identify all activities that can be performed using the API of a known cloud-based service. However, because of a large number of providers of known cloud-based services accessed by enterprise users, it is not feasible to build specific-parsers for APIs of all providers. Cloud-based services implementing a category of service allow users to perform similar activities, e.g., the cloud-based services implementing the "personal pages and blogs" category of service allow users to perform activities such as create posts, comment on posts, upload or embed pictures and multimedia, moderate, publish RSS (rich site summary) feeds, etc. The category-directed parser uses category-directed match rules to collect the related metadata from the request and response messages. FIGS. 6A, 6B, and 6C present step-by-step parsing of the message 400 by the "PersonalPagesAndBlogs" category-directed parser. The parsing logic of the "PersonalPagesAndBlogs" category-directed parser is presented using pseudo statements.

"Post a Comment" Activity

FIG. 6A is an illustration 600A identifying parts of the request message 400 and corresponding logic in the "PersonalPagesAndBlogs" category-directed parser to identify the activity performed. In one implementation, the parsing logic in a category-directed parser is organized according to the activities. For example, in case of "PersonalPagesAndBlogs" category-directed parser, the activities include "post a comment", "upload a file", etc. Before performing the parsing of the message (request or response), headers in the message are matched to identification rules to determine the activity. FIG. 6A shows a portion 601 of the "PersonalPagesAndBlogs" category-directed parser. The <Header Match Segment> and <end of Match Segment> tags 650 and 690, respectively, include match statements 662 and 682 that match parameters in the URL request to identification rules, prior to using the category-directed match rules. The identification rules require the content in the message to be in the form of key-value pairs and sent to the server using an HTTP POST method. A boolean logic statement 672 indicates that both statements 662 and 682 need to be true for application of category-directed match rules. An example follows that builds on the "post a comment" message shown in FIG. 4.

In a pair of example match statements, 662 and 682, values in the match statements are matched against request parameters included in the request header part 461 of the request message 400, which are indicated by labels 453 and 466. These parameters are tested against the match statements. A match rule forms a logical expression in which left hand side is matched to right hand side. The "field name" part of the match statement (such as identified by label 663 in the match statement 662) identifies a label of the request parameter in the request header to which a "literal" in "value to match" statement 667 is matched. In one implementation, in the first match statement 662, the field name 663 is "content-type" field which maps to the request parameter identified by the label 466 in the request headers 461. The "content-type" request parameter 466 has a value "application/x-www-form-urlencoded" indicating that the contents of the message (presented in FIG. 6B) are in the form of key-value pairs. This value is tested against the "literal" value in the statement 667. Other examples of "content-type" field values in an HTTP POST message include "application/json" indicating a java script object notation (JSON) data interchange format and "multipart/form-data"

indicating a multipurpose internet mail extensions (MIME) encoding. The "match type" statement 665 indicates the type of match performed e.g., a string match. The second match statement 682 compares a value of the request parameter "method" 453 in the request message to determine that the method is an HTTP POST method. In one implementation, the value of the "method" request parameter in the request message is tested against a list of allowed method values to determine a match as shown in a statement 686.

If results of both match statements 662 and 682 are true, the "PersonalPagesAndBlogs" category-directed parser applies the category-directed match rules 613 as shown in box 602 in FIG. 6B (600B) to form data 481 in the request message 400. The form data (also referred to as HTTP POST data or POST body) contains contents of the message 400 in the form of key-value pairs. The category-directed match rules are formed according to the "content-type" as identified above. If the content is organized as key-value pairs (as in the case of the example 400) each category-directed match rule contains "key to match" statement to identify "key" literals in the message. The Category-directed match rules 613 are a list of actions enclosed within the <Body Match Segment> and <end of Match Segment> tags 641 and 691 respectively. Other types of actions related to matching of category-directed match rules include assigning metadata to system variables and sending of metadata to DLP processor.

The category-directed match rules 613 are derived from multiple syntaxes used by numerous known providers to implement "personal pages and blogs" category of service addressed by the "PersonalPagesAndBlogs" category-directed parser and, for instance, the "post a comment" activity of the service. In one implementation, the multiple category-directed match rules include at least ten match rules, which reflect an approximate floor of complexity of activities available with some services. Ten is a practical lower limit of match rules for a particular category, based on experience. No maximum has been determined, but practically, 1,000 match rules would be cumbersome and would invite subdivision of a category into further categories. These match rules are derived from multiple syntaxes used by the numerous known providers to implement the category of service addressed by the category-directed parser. In one implementation, the multiple category-directed match rules are derived from syntaxes used by at least twenty five known providers that each implement the category of service addressed by the category-directed parser. Twenty-five is an approximate estimate of minimum number of providers in a category. As presented earlier, an example list of fifty providers of "personal pages and blogs" category of service is available in the article "50 Successful Blogs in Every Topic Imaginable" from the top level URL sparringmind.com. Different providers of cloud-based services belonging to the "personal pages and blogs" category of service use different "keys" in key-value pairs to describe contents in the form data. In the example message 400, the user's comment is included as a key-value pair 474 in which key is "comment" and value is "Your post is very informative, thank you" which is the user's comment on the blog post. Suppose, the statement 685 (in category-directed match rule 688) has a value of literal "comment". This results in a positive match when tested against the request parameter key "comment" in key-value pair 474.

However, it can be seen, that category-directed match rules 613 include multiple match rules 658, 668, 678, 688, and so on, that attempt to capture the metadata from messages from other known cloud-based providers. For example, a second provider may include the same comment using a different key such as "message". In such an example, another match rule with a key to match literal "message" applies instead of the match rule 688. The match rules 613 contain logic to parse form data (or post data) which is in the form of key-value pairs. A different set of match rules with a different match logic are applied to parse request and response messages containing data in other formats such as JSON and MIME as described above. The match rule 688 includes a statement 683 "field name :literal". In the example of the request message 400, the field name is "post data" or "form data". Therefore, in this match rule, a key "comment" identified in a statement 685 is matched to form data (or post data) 481 containing key-value pairs to determine whether the key "comment" is present in form data or not. A complete list of category directed match rules 613 is not presented in the box 602 in FIG. 6B. The purpose of the example is to illustrate application of category-directed match rules to collect metadata from content being conveyed via the API.

FIG. 6C presents an example 600C in which assign statements 614 (shown in box 603) assign values of keys from key-value pairs in the request message 400 to a system variable. As explained above the category-directed match rules 613 are derived from multiple syntaxes used by the numerous known providers of cloud-based services to implement the category of service addressed by the category-directed parser. The category-directed parser retains the results of a successfully resolved match rule by using an assign statement such as 680. The assign statement with a correlated name to the successfully resolved match rule causes the retained value to be assigned to a system variable. In one implementation, the assign statement 680 comprises of a statement 684 "Assignment type: enumeration" which identifies the content-type from which value is assigned to the system variable in a statement 689. As described above, one example of content-type is key-value pairs. In such a case, the statement 684 instructs the category-directed parser to assign value of a key in the request message 400 to the system variable. The key is identified in a statement 687 "Key to match :literal" and the system variable is identified in the statement 689. Following this, the category-directed parser sends the collected metadata and contents to the DLP processor for inspection.

A user accessing a cloud-based service cloud-based service implementing a category of service performs a variety of activities related to the category of service. The category-directed parser collects metadata related to the activity performed and sends it as metadata to the DLP processor. In one implementation, a trigger is invoked which sends the activity data (including metadata and contents) to the DLP processor. The metadata includes data that helps the DLP processor to inspect contents and apply a security policy. For example, the trigger informs the DLP processor that the data is collected from a request message (HTTP POST) or a response message (HTTP GET). Depending on the activity performed, the category-directed parser identifies an "object" for the DLP processor to inspect. For example, if the activity is "log in" the object is "username"; if the activity is an upload or a download, the object is a "file".

"Upload a File" Activity

Continuing with the "PersonalPagesAndBlogs" category-directed parser, now consider the enterprise user attempts to upload a file to a provider "WordPress.com" belonging to "personal pages and blogs" category of service, using the WordPress™ API. The inline proxy 161 receives a request message (HTTP POST) and proxy follows the same process as described above in FIGS. 5A and 5B to identify a category of service from the request URL and select the category-directed parser. Consider, the "PersonalPagesAndBlogs" category-directed parser is selected and parses the request message headers (as described in FIG. 6A) to determine the activity performed. For this purpose, a pair of match statements (also referred to as identification rules) in the header match segment (as presented in FIG. 6A) are applied. Values in the match statements are tested against request parameters included in the request header part of the request message.

A first match statement is similar to the match statement 682 in FIG. 6A and identifies that the request message is being sent using HTTP POST method. A second match statement identifies that the request message contains a file attachment in the form of "multipart/form-data". Following the application of identification rules in the header match segment to identify the activity, the category-directed match rules are applied to collect metadata related to object of the activity. In one implementation, the attached file is MIME encoded. The category-directed match rules collect the related metadata including type of the object (which is "file" in this example) and the size of the object (which is the size of the file in this example). The metadata and the contents of the message are passed to the DLP processor to focus its analysis. The category-directed parser includes activity identification match rules and category-directed match rules corresponding to the activities of known cloud-based services belonging to the category of service.

Generic Parser

As discussed above in relation to FIG. 3D, when the inline proxy determines that an unknown cloud-based service is being accessed via an API for which no service-specific parser and no category-directed parser is available. The inline proxy selects and applies a generic parser (also referred to as a universal connector) to the API being accessed. Consider a user attempts to send a request message "support.gluu.org/installation/7139/service-issues/" to the cloud-based service gluu.org. As described in FIG. 3D above, the inline proxy determines that the user is accessing an unknown cloud-based service "gluu.org". The inline proxy 161 applies a generic parser to the API of the unknown cloud-based service. The generic parser does not include match rules organized according to the activities performed by the users as the generic parser is not aware of the activities that will be conducted using the APIs of unknown cloud-based services.

No new matter has been introduced in the course of deleting prefaces to top-level domains.

The generic parser includes at least one default match rule to implement at least two categories of services addressed by the category-directed parsers. For example, a generic parser includes a default match rule "upload file" which is applied to all activities that send data to a server in an HTTP POST request message. In case of known cloud-based services these activities are provided by cloud-based services in at least two categories of services. For example, "send email" activity from "webmail" category of service and "post a comment" activity from "personal pages and blogs" category are both considered as "upload file" activity when the request is processed by a generic parser. Therefore, the generic parser collects fewer metadata as compared to category-directed parsers. As multiple types of activities are handled by the generic parser using a default match rule, the generic parser sends an additional variable to DLP processor containing a label that the metadata is collected by the generic parser. This additional metadata helps the DLP processor to avoid false positives by giving the DLP processor information that optionally can use to relax its tolerance. Relaxation of the tolerance for taking action against an upload can be accompanied by reporting for investigation the site for which the tolerance was relaxed. For example, a request message that is posting a comment on a blog post but is sent to the DLP processors as a file upload activity can be blocked by a DLP processor if security policy states that file uploads are not allowed. This however, is a false positive and including an additional metadata to inform the DLP processor that the request message is parsed by a generic parser can help the DLP processor to include this information when enforcing the policy.

Computer System

Figure 7:
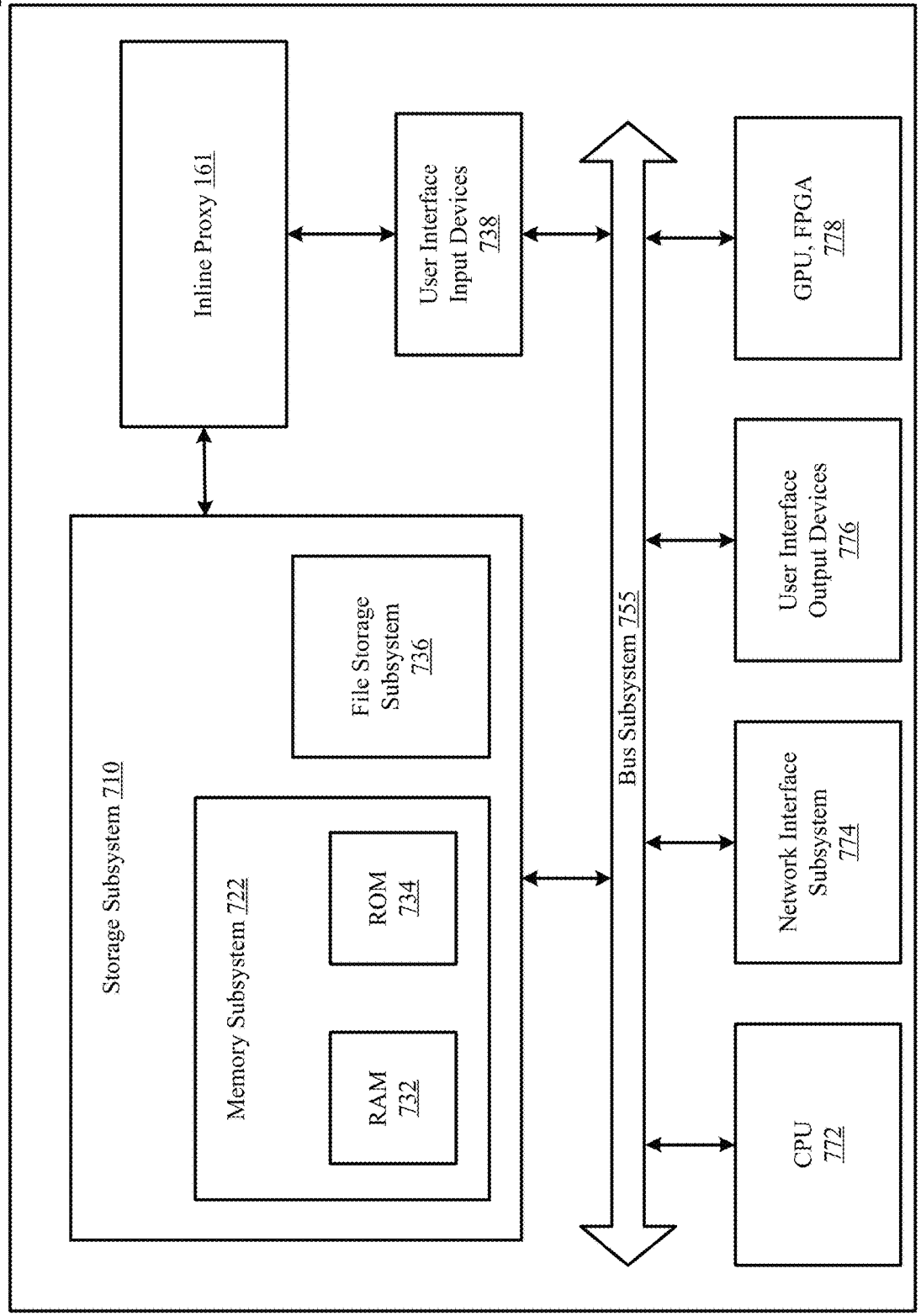
FIG. 7 is a simplified block diagram of a computer system that can be used to implement the technology disclosed.

FIG. 7 is a simplified block diagram of a computer system 700 that can be used to implement the inline proxy 161 of FIG. 1 for applying data loss prevention to cloud-based content storage and hosting services (collectively, "cloud-based services") for which no service-specific parser is available. Computer system 700 includes at least one central processing unit (CPU) 772 that communicates with a number of peripheral devices via bus subsystem 755. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems.

In one implementation, the inline proxy 161 of FIG. 1 is communicably linked to the storage subsystem 710 and the user interface input devices 738.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present invention. Many other configurations of computer system 700 are possible having more or less components than the computer system depicted in FIG. 7.

Particular Implementations

The technology disclosed relates to applying data loss prevention (abbreviated DLP) to cloud-based content storage and hosting services (collectively, "cloud-based services") for which no service-specific parser is available.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A first system implementation of the technology disclosed includes one or more processors coupled to memory. The memory is loaded with computer instructions to apply data loss prevention (abbreviated DLP) to cloud-based content storage and hosting services (collectively, "cloud-based services") for which no service-specific parser is available. The system determines that a known cloud-based service is being accessed via an application programming interface (abbreviated API). The system determines that no service-specific parser is available for the API being accessed and applies a category-directed parser to the API being accessed. The category-directed parser includes multiple category-directed match rules derived from multiple syntaxes used by numerous known providers to implement a category of service addressed by the category-directed parser. The category-directed parser collects metadata from content being conveyed via the API and assigns the collected metadata to variables, using the category-directed match rules. The system invokes a DLP processor and sends the collected metadata to the DLP processor for use in focusing analysis of content being conveyed via the API.

This system implementation and other systems disclosed optionally include one or more of the following features. The system can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system determines to use the category-directed parser based on a domain name in a uniform resource locator (abbreviated URL) used to access the API.

The multiple match rules include at least ten match rules derived from the multiple syntaxes used by the numerous known providers to implement the category of service addressed by the category-directed parser. The multiple match rules are derived from syntaxes used by at least twenty five known providers that each implement the category of service addressed by the category-directed parser.

The cloud-based services are served by at least five category-directed parsers in distinct categories of service. One of the at least five categories of service is personal pages and blogs that do not have service-specific parsers. Other categories of service in the at least five categories of services include news websites that do not have service-specific parsers, cloud-based storage services that do not have service-specific parsers, social media services that do not have service-specific parsers, and webmail services that do not have service-specific parsers.

The collecting metadata from content being conveyed via the API further includes, processing a request message from a client to a server hosting the known cloud-based service. The request message is followed by an upload of the content from the client to the server that is subject to DLP inspection. The collecting metadata from content being conveyed via the API further includes, processing a response from the server hosting the known cloud-based service that is responsive to the request message. The response message is followed by a download of the content from the server to the client that is subject to the DLP inspection.

The collection of metadata from content being conveyed via the API further includes accumulation of metadata from processing multiple request messages from the client to the server hosting the known cloud-based service.

The application of the category-directed parser to the API being accessed includes the following. The system identifies a domain name of the known cloud-based service by parsing a uniform resource locator (URL) used to access the API. Following this, the system determines that no service-specific parser is available for the API being accessed by matching the domain name with entry lists of domain names for available service specific parsers. The system finds a match of the domain name in an entry list of domain names for the category-directed parser.

In one implementation, the system includes, invoking a portion of the category-directed parser by using a resource description identified from the parsed URL request. The system matches the parameters in the URL to identification rules, prior to using the category-directed match rules to collect metadata from content being conveyed via the API. Following this, the system assigns the collected metadata to variables using category-directed match rules.

A match rule in the multiple category-directed match rules include a left hand side designator identifying the content label (also referred to as a key), and a right hand side designator for a target label to match the content label in a particular syntax from the multiple syntaxes. The multiple syntaxes used by the numerous known providers of the known cloud-based services to implement the category of service. The system retains the results of a successfully resolved match rule by using an assign statement. The assign statement with a correlated name to the successfully resolved match rule causes the retained value to be assigned to a system variable.

Other implementations may include a non-transitory computer readable storage medium storing instructions executable by a processor to perform functions of the system described above. Yet another implementation may include a method performing the functions of the system described above.

A first method implementation of the technology disclosed includes applying data loss prevention (abbreviated DLP) to cloud-based content storage and hosting services (collectively, "cloud-based services") for which no service-specific parser is available. The method includes determining that a known cloud-based service is being accessed via an application programming interface (abbreviated API). Following this, the method includes determining that no service-specific parser is available for the API being accessed and applying a category-directed parser to the API being accessed. The category-directed parser includes multiple category-directed match rules derived from multiple syntaxes used by numerous known providers to implement a category of service addressed by the category-directed parser. The category-directed parser collects metadata from content being conveyed via the API and assigns the collected metadata to variables, using the category-directed match rules. The method includes invoking a DLP processor and sending the collected metadata to the DLP processor for use in focusing analysis of content being conveyed via the API.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

A second system implementation of the technology disclosed includes one or more processors coupled to memory. The memory is loaded with computer instructions to apply data loss prevention (abbreviated DLP) to cloud-based content storage and hosting services (collectively, "cloud-based services") for which no service-specific parser is available. The system determines that an unknown cloud-based service is being accessed via an application programming interface (abbreviated API) for which no service-specific parser and no category-directed parser is available. The system applies a generic parser to the API being accessed. The generic parser includes at least one default match rule to implement at least two category of services addressed by the category-directed parsers. The system collects metadata from content being conveyed via the API and assigns the collected metadata to variables. The system includes an additional variable in the metadata. The additional variable contains a label identifying that the metadata was collected by the generic parser. The system invokes a DLP processor and sends the assigned metadata and the additional variable to the DLP processor for use in analysis of content being exchanged via the API with the unknown cloud-based service that is subject to DLP inspection.

The second system implementation and other systems disclosed optionally include one or more of the features described in relation to the first system implementation presented above. The system can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

A second method implementation of the technology disclosed includes applying data loss prevention (abbreviated DLP) to cloud-based content storage and hosting services (collectively, "cloud-based services") for which no service-specific parser is available. The method includes determining that an unknown cloud-based service is being accessed via an application programming interface (abbreviated API) for which no service-specific parser and no category-directed parser is available. Following this, the method includes applying a generic parser to the API being accessed. The generic parser includes at least one default match rule to implement at least two category of services addressed by the category-directed parsers. The method includes collecting metadata from content being conveyed via the API and assigning the collected metadata to variables. The method includes an additional variable in the metadata. The additional variable contains a label identifying that the metadata was collected by the generic parser. The method includes invoking a DLP processor and sending the assigned metadata and the additional variable to the DLP processor for use in analysis of content being exchanged via the API with the unknown cloud-based service that is subject to DLP inspection.

Each of the features discussed in this particular implementation section for the second system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the second system implementation apply equally to the CRM implementation. As indicated above, all the system features are not repeated here and should be considered repeated by reference

What is claimed is:

1. A system including one or more processors coupled to memory, the memory loaded with computer instructions to provide metadata used to apply data loss prevention, DLP, to cloud-based content services, the instructions, when executed on the processors, implement actions comprising:

determining by an inline proxy, which has available a first set of service specific parsers and a second set of category-directed parsers, that a cloud-based service known to the inline proxy and at a URL recognized by the inline proxy is being accessed via an application programming interface, (API) wherein providers of the cloud-based services use different syntaxes to implement services;

determining that no service-specific parser is available to the inline proxy for the API;

determining by the inline proxy a category of service for the API;

selecting by the inline proxy a service category-directed parser based upon the determined category;

wherein the service category-directed parser includes a plurality of service category-directed match rules derived from a plurality of syntaxes used by providers of the cloud-based content services to implement the category of service;

the service category-directed parser collecting the metadata for content being conveyed via the API by at least processing a request message from a client to a server hosting the cloud-based service directed to an upload or download via the API of the content between the client and the server that is used to apply data loss prevention and assigning the collected metadata to variables, using the service category-directed match rules; and transmitting the collected metadata assigned to the variables to a DLP processor that focuses analysis on the content being conveyed via the API and applies the data loss prevention.

2. The system of claim 1, further implementing actions comprising:

if no service category-directed parser is available to be selected for the API being accessed in the selecting action:

selecting a generic parser, wherein the generic parser includes at least one default match rule derived from the plurality of syntaxes used by providers of cloud-based content services, wherein the default match rule is associated with a plurality of categories of services; and parsing content being conveyed via the API using the match rules of the selected-generic parser and assigning the collected metadata to variables.

3. The system of claim 1, wherein determining to use the service category-directed parser is based on a domain name in the uniform resource locator (abbreviated URL) used to access the API.

4. The system of claim 1, wherein the plurality of match rules include at least ten match rules derived from the plurality of syntaxes used by the providers of cloud-based content services to implement the category of service addressed by the service category-directed parser.

5. The system of claim 1, wherein the plurality of match rules are derived from syntaxes used by at least twenty five providers of cloud-based content services that each implement the category of service addressed by the service category-directed parser.

6. The system of claim 1, wherein the cloud-based services are served by at least five service category-directed parsers in distinct categories of service.

7. The system of claim 6, wherein the distinct categories of services served by the at least five service category-directed parsers include at least personal pages and blogs, news websites, cloud-based storage services, webmail, and social media services.

8. The system of claim 1, wherein collecting metadata from content being conveyed via the API further includes, processing a request message from a client to a server hosting the known cloud-based service.

9. The system of claim 8, wherein the request message is followed by an upload via the API of the content from the client to the server that is subject to DLP inspection.

10. A method of providing metadata used to apply data loss prevention, DLP, to cloud-based content services, including:

determining by an inline proxy, which has available a first set of service specific parsers and a second set of category-directed parsers, that a cloud-based service at a URL recognized by the inline proxy is being accessed via an application programming interface, API, wherein providers of the cloud-based services use different syntaxes to implement services;

determining that no service-specific parser is available to the inline proxy for the API;

determining by the inline proxy a category of service for the API;

selecting by the inline proxy a service category-directed parser based upon the determined category;

wherein the service category-directed parser includes a plurality of service category-directed match rules derived from a plurality of syntaxes used by providers of cloud-based content services to implement the category of service;

the service category-directed parser collecting the metadata for content being conveyed via the API by at least processing a request message from a client to a server hosting the cloud-based service directed to an upload or download via the API of the content between the client and the server that is used that is used to apply data loss prevention and assigning the collected metadata to variables, using the service category-directed match rules; and transmitting the collected metadata assigned to the variables to a DLP processor that focuses analysis on the content being conveyed via the API and applies the data loss prevention.

11. The method of claim 10, wherein determining to use the service category-directed parser is based on a domain name in the uniform resource locator (abbreviated URL) used to access the API.

12. The method of claim 10, wherein the plurality of match rules include at least ten match rules derived from the plurality of syntaxes used by the providers of cloud-based content services to implement the category of service addressed by the service category-directed parser.

13. The method of claim 10, wherein the plurality of match rules are derived from syntaxes used by at least twenty five providers of cloud-based content services that each implement the category of service addressed by the service category-directed parser.

14. The method of claim 10, wherein the cloud-based services are served by at least five service category-directed parsers in distinct categories of service.

15. The method of claim 14, wherein the distinct categories of services served by the at least five service category-directed parsers include at least personal pages and blogs, news websites, cloud-based storage services, webmail, and social media services.

16. The method of claim 10, wherein collecting metadata from content being conveyed via the API further includes, processing a request message from a client to a server hosting the known cloud-based service.

17. The method of claim 16, wherein the request message is followed by an upload via the API of the content from the client to the server that is subject to DLP inspection.

18. A system including one or more processors coupled to memory, the memory loaded with computer instructions to provide metadata used to apply data loss prevention, DLP, to cloud-based content services, the instructions, when executed on the processors, implement actions comprising:

determining by an inline proxy, which has available a first set of service specific parsers, a second set of category-directed parsers, and a third set of generic parsers, that a cloud-based service known to the inline proxy is being accessed via an application programming interface, API, for which no service-specific parser and no service category-directed parser is available to the inline proxy, wherein providers of the cloud-based services use different syntaxes to implement services;

selecting by the inline proxy a generic parser based upon the determination that an unknown cloud-based service is being accessed;

wherein the generic parser includes at least one default match rule derived from a plurality of syntaxes used by providers of cloud-based content services, wherein the default match rule is associated with at least two categories of services addressed by service category-directed parsers;

the selected generic parser collecting the metadata that is used to apply data loss prevention and assigning the collected metadata to variables; and transmitting the collected metadata, assigned to the variables and accompanied by data indicating that the metadata was collected by the generic parser, to a DLP processor that focuses analysis on the content being conveyed via the API and applies the data loss prevention.

\* \* \* \* \*